United States Patent [19]

Hiraoka et al.

[11] Patent Number: 5,981,649
[45] Date of Patent: Nov. 9, 1999

[54] RUBBER COMPOSITION FOR GRIPS OF ARTICLES CONTAINING EPDM AND GRIP MADE THEREOF

[75] Inventors: Hidenori Hiraoka, Kobe; Akihiko Hamada, Kakogawa, both of Japan

[73] Assignee: Sumitomo Rubber Industries, Ltd., Osaka, Japan

[21] Appl. No.: 08/063,290

[22] Filed: May 19, 1993

[30] Foreign Application Priority Data

May 28, 1992 [JP] Japan .................................. 4-154485

[51] Int. Cl.$^6$ ............................. C08L 23/16; C08L 23/22
[52] U.S. Cl. ...................... 524/525; 524/524; 524/526; 524/271; 524/274; 525/227; 525/232; 525/240
[58] Field of Search ...................... 524/525, 524, 524/526, 271, 274; 525/240, 232, 227

[56] References Cited

U.S. PATENT DOCUMENTS

| | | | |
|---|---|---|---|
| 4,247,652 | 1/1981 | Matsuda et al. | 525/240 |
| 4,843,128 | 6/1989 | Cesare | 524/526 |
| 4,882,387 | 11/1989 | Tobing | 525/237 |
| 5,095,068 | 3/1992 | Chiu | 524/525 |
| 5,242,727 | 9/1993 | Briddell et al. | 525/240 |
| 5,242,971 | 9/1993 | Nakahama et lal. | 524/526 |

*Primary Examiner*—James J. Seidleck
*Assistant Examiner*—Olga Asinovsky
*Attorney, Agent, or Firm*—Antonelli, Terry, Stout & Kraus, LLP

[57] ABSTRACT

A rubber composition suitable for use in grips of articles such as golf clubs, tennis rackets, bicycles and tools, comprising (1) a rubber component containing an ethylene-propylene-diene rubber (EPDM), and (2) 5 to 100 parts by weight of a polyisobutylene having a viscosity average molecular weight of 6,000 to 50,000, which provides grips having good feeling of touch, good non-slipping properties in both fine and rainy weather, and giving a small feeling of impact to mis-shot of golf balls as compared with conventional grips.

18 Claims, No Drawings

RUBBER COMPOSITION FOR GRIPS OF ARTICLES CONTAINING EPDM AND GRIP MADE THEREOF

BACKGROUND OF THE INVENTION

The present invention relates to a rubber composition suitable for use in various grips, e.g., grips of golf clubs, grips of tennis rackets, grips to be attached to handlebars of bicycles, motorcycles or cultivators, and grips to be attached to tools such as hammers, and also relates to a grip prepared from the composition.

In general, as the properties to be required for grips, it is important that they are not slippery and have a good feeling of touch. It is also desirable that they have a cushioning action to an impact.

A representative grip which has a good feeling of touch is a grip made of leather. Grips made of rubber have also been used. For example, there are known grips made from rubber compositions containing, as a base rubber, natural rubber alone, an ethylene-propylene-diene rubber (EPDM), or a blend of natural rubber and a styrene-butadiene rubber (Japanese Patent Publication Kokai No. 1-306446). These rubber grips have a good non-slipping property.

However, these grips have some deficiencies. For example, if grips made of leather once get wet as a result of use in a rainy day, hardening of the leather is marked and the grips lose their original good feeling of touch. Grips made from rubber compositions containing natural rubber or a blend of natural rubber and SBR deteriorate with the lapse of time, thus losing a non-slipping property and a good feeling of touch. Grips made from rubber compositions containing EPDM as a base rubber component have the advantage that they are more resistant to deterioration, but they have the disadvantages that they do not give a good feeling of touch, and they are slippery particularly when they get wet in a rainy day, and they give a large impact at a mis-shot of a golf ball.

It is an object of the present invention to provide a rubber composition suitable for preparing grips used in various articles.

Another object of the present invention is to provide grips which have a good feeling of touch, which can maintain a good non-slipping property regardless of fine weather and rainy weather, and which only give a small impact at mis-shot of golf balls.

These and other objects of the present invention will become apparent from the description hereinafter.

SUMMARY OF THE INVENTION

In accordance with the present invention, there is provided a rubber composition suitable for use in grips of articles, which comprises (1) a rubber component containing an ethylene-propylene-diene rubber (EPDM), and (2) 5 to 100 parts by weight of a polyisobutylene having a viscosity average molecular weight of 6,000 to 50,000 per 100 parts by weight of said rubber component.

DETAILED DESCRIPTION

An ethylene-propylene-diene rubber (EPDM) is used as a base rubber in the present invention. That is to say, EPDM may be used alone as the rubber component of the composition or may be used in combination with other rubbers as the rubber component of the composition. EPDM has a good aging resistance such as ozone cracking resistance, and imparts a proper flexibility to the products. Also, it has a good compatibility with polyisobutylene.

EPDM rubbers used in the present invention are not particularly limited, and known ethylene-propylene-diene rubbers (EPDM) can be used. Representative examples of commercially available preferable EPDM rubbers are, for instance, ESPRENE 505 and ESPRENE 505A (trade mark, products of Sumitomo Chemical Co., Ltd.), EP33 (trade mark, product of Japan Synthetic Rubber Co., Ltd.), and the like.

Examples of the other rubbers which may be used with EPDM are, for instance, natural rubber, isoprene rubber, butadiene rubber, styrene-butadiene rubber, chloroprene rubber, butyl rubber, ethylene-propylene rubber, and acrylonitrile rubber. The content of the other rubbers in the rubber component is at most 45% by weight.

A polyisobutylene having a viscocity average molecular weight of 6,000 to 50,000 is used in an amount of 5 to 100 parts by weight, preferably 10 to 70 parts by weight, per 100 parts by weight of the rubber component. The polyisobutylene used in the present invention is a liquid or semi-solid material having a fluidity, and moreover, it has a stickiness. The polyisobutylene serves to raise the feeling of touch of the produced grips and to provide a non-slipping property to the grips in rainy weather. Also, since it has a good vibration absorbing property, an impact at the time of mis-shot is decreased. When the viscosity average molecular weight of the polyisobutylene is less than 6,000, the stickiness is too high to give a good feeling of touch. When the viscosity average molecular weight is more than 50,000, the stickiness is too low and the feeling of touch becomes rather worse.

Polyisobutylene having a viscosity average molecular weight of 8,000 to 12,000 is particularly preferred.

Representative examples of the commercially available polyisobutylene which has a viscosity average molecular weight within the range of 6,000 to 50,000 are, for instance, VISTANEX LM-MS (polyisobutylene having a viscosity average molecular weight of 8,700 to 10,000 made by Exxon Chemical Co.), VISTANEX LM-MH (polyisobutylene having a viscosity average molecular weight of 10,000 to 11,700 made by Exxon Chemical Co.), and the like.

When the amount of the polyisobutylene is less than 5 parts by weight per 100 parts by weight of the rubber component, the desired effects are not sufficiently exhibited. When the amount of the polyisobutylene is more than 100 parts by weight per 100 parts by weight of the rubber component, the feeling of touch becomes rather worse.

The rubber composition according to the present invention may contain additives, e.g., a filler, a curing agent, a curing accelerator, a softener, a plasticizer, and other usual additives such as carbon black and antioxidant.

Examples of the filler are, for instance, clay, kaolin, kaolin clay, talc, a metal carbonate such as magnesium carbonate, barium carbonate, calcium carbonate or strontium carbonate, barium sulfate, calcium sulfate, silicon oxide, white carbon, and other inorganic or organic fillers generally used in rubber compositions. The fillers may be used alone or in admixture thereof. The amount of the filler is from 10 to 100 parts by weight, especially 10 to 50 parts by weight, per 100 parts by weight of the rubber component.

Any of curing agents usually employed for vulcanization of rubbers can be employed in the present invention, e.g., organic peroxides, sulfur and organic sulfur compounds. The amount of the curing agent is from 0.1 to 15 parts by weight, preferably 0.2 to 5 parts by weight, per 100 parts by weight of the rubber component.

Any of curing accelerators usually employed for vulcanization of rubbers can be employed in the present invention e.g., aldehyde ammonia compounds, sulfenamide compounds, benzothiazole compounds, thiuram compounds, dithiocarbamate compounds, guanidine compounds and thiourea compounds. The amount of the curing accelerator is from 0.2 to 10 parts by weight, preferably 0.2 to 8 parts by weight, per 100 parts by weight of the rubber component.

Zinc oxide and stearic acid may be optionally used as an activator. The amount of zinc oxide is from 2 to 10 parts by weight per 100 parts by weight of the rubber component. The amount of stearic acid is from 0.5 to 5 parts by weight per 100 parts by weight of the rubber component.

Softeners or plasticizers may be optionally incorporated in the rubber composition according to the present invention in addition to the polyisobutylene in order to control the stickiness. Any of softeners or plasticizers usually employed in the preparation of rubber compositions can be employed in the present invention, e.g., a liquid isoprene rubber, a liquid butadiene rubber, paraffin oil, aromatic oil, naphthenic oil and other vegetable or mineral oils. The amount of the softener or plasticizer is at most 70 parts by weight, preferably from 5 to 25 parts by weight, per 100 parts by weight of the rubber component.

Kneading for preparing the rubber composition according to the present invention can be made by a suitable mixing machine such as a roll mixer, a Banbury mixer or a kneader. Components other than the curing agent and the curing accelerator may be previously mixed, and the curing agent and the curing accelerator then can be added thereto and the components mixed on rolls.

The rubber composition is filled in a suitable mold and is cured, for example, by heating at a temperature of 155° to 180° C. for 2 to 15 minutes under a pressure.

Grips obtained from the rubber composition according to the present invention may be subjected to buffing by means of a sand paper in order to improve the non-slipping property or the feeling of touch.

The present invention is more specifically described and explained by means of the following examples, in which all parts are by weight unless otherwise noted. It is to be understood that the present invention is not limited to the Examples.

EXAMPLES 1 to 6 AND COMPARATIVE EXAMPLES 1 to 3

Rubber compositions for grips were prepared According to the recipes shown in Table 1, filled in a mold and cured at 170° C. for 5 minutes under a pressure of 60 kg/cm$^2$. Unnecessary portions on the surface of the cured products were cut off and the surface was buffed with a #100 sand paper to give grips for golf clubs.

TABLE 1

| Ingredients (part) | Ex. 1 | Ex. 2 | Ex. 3 | Ex. 4 | Ex. 5 | Ex. 6 | Com. Ex. 1 | Com. Ex. 2 | Com. Ex. 3 |
|---|---|---|---|---|---|---|---|---|---|
| EPDM*[1] | 100 | 100 | 80 | 80 | 90 | 90 | 100 | 100 | 100 |
| Natural rubber*[2] | — | — | 20 | 20 | — | — | — | — | — |
| SBR*[3] | — | — | — | — | 10 | 10 | — | — | — |
| VISTANEX LM-MS*[4] | 50 | — | 40 | — | 55 | — | — | — | 130 |
| VISTANEX LM-MH*[5] | — | 50 | — | 40 | — | 55 | — | — | — |
| White carbon | 30 | 30 | 30 | 30 | 30 | 30 | 30 | 30 | 30 |
| Kaolin clay | 5 | 5 | 5 | 5 | 5 | 5 | 5 | 5 | 5 |
| Zinc oxide | 5 | 5 | 5 | 5 | 5 | 5 | 5 | 5 | 5 |
| Stearic acid | 1 | 1 | 1 | 1 | 1 | 1 | 1 | 1 | 1 |
| Paraffin oil (softener) | — | — | — | — | — | — | — | 50 | — |
| Antioxidant*[6] | 0.5 | 0.5 | 0.5 | 0.5 | 0.5 | 0.5 | 0.5 | 0.5 | 0.5 |
| Carbon black | 5 | 5 | 5 | 5 | 5 | 5 | 5 | 5 | 5 |
| Sulfur | 1.5 | 1.5 | 1.2 | 1.2 | 0.8 | 0.8 | 1.5 | 1.5 | 1.5 |
| Accelerator CZ*[7] | 1.0 | 1.0 | 1.0 | 1.0 | 1.0 | 1.0 | 1.0 | 1.0 | 1.0 |
| Accelerator TT*[8] | 0.5 | 0.5 | 0.3 | 0.3 | 0.3 | 0.3 | 0.5 | 0.5 | 0.5 |

(Notes)
*[1]Ethylene-propylene-diene rubber made by Sumitomo Chemical Co., Ltd. (trade mark "ESPRENE 505A")
*[2]RSS #3 (natural rubber #3)
*[3]SBR1502 (styrene-butadiene rubber made by Japan Synthetic Rubber Co., Ltd.
*[4]Trade mark, Polyisobutylene having a viscosity average molecular weight of 8700 to 10000 made by Exxon Chemical Co.
*[5]Trade mark, Polyisobutylene having a viscosity average molecular weight of 10000 to 1 1700 made by Exxon Chemical Co.
*[6]Alkylphenol antioxidant made by Ohuchi Shinko Kagaku Kogyo Kabushiki Kaisha (trade mark "Nocrac NS-6")
*[7]N-Cyclohexyl-2-benzothiazylsulfenamide
*[8]Tetramethylthiuram disulfide Each of the obtained grips was attached to a wood #1 golf club, and was estimated by 100 persons including professional golfers with respect to feeling of touch, non-slipping properties in fine weather and in rainy weather, and an impact that they have felt at the time of mis-shot. The estimation was made in three ratings, "good", "ordinary" and "bad" with respect to the feeling of touch and the non-slipping property, and in three ratings, "small", "medium" and "large" with respect to the feeling of impact. The results of the estimation are shown by the number of estimators for each rating in Table 2.

TABLE 2

|  | Ex.1 | Ex. 2 | Ex. 3 | Ex. 4 | Ex. 5 | Ex. 6 | Com. Ex. 1 | Com. Ex. 2 | Com. Ex. 3 |
|---|---|---|---|---|---|---|---|---|---|
| Feeling of touch | | | | | | | | | |
| Good | 68 | 79 | 93 | 98 | 72 | 69 | 5 | 2 | 0 |
| Ordinary | 32 | 21 | 7 | 2 | 27 | 29 | 21 | 30 | 18 |
| Bad | 0 | 0 | 0 | 0 | 1 | 2 | 74 | 68 | 82 |
| Non-slipping property in fine weather | | | | | | | | | |
| Good | 89 | 86 | 97 | 94 | 85 | 82 | 1 | 70 | 75 |
| Ordinary | 11 | 14 | 3 | 6 | 14 | 16 | 87 | 28 | 23 |
| Bad | 0 | 0 | 0 | 0 | 1 | 2 | 12 | 2 | 2 |
| Non-slipping property in rainy weather | | | | | | | | | |
| Good | 93 | 88 | 77 | 75 | 81 | 84 | 0 | 73 | 71 |
| Ordinary | 7 | 12 | 22 | 23 | 19 | 16 | 9 | 27 | 28 |
| Bad | 0 | 0 | 1 | 2 | 0 | 0 | 91 | 0 | 1 |
| Impact | | | | | | | | | |
| Small | 53 | 46 | 43 | 38 | 49 | 49 | 8 | 5 | 11 |
| Medium | 45 | 43 | 48 | 50 | 45 | 41 | 19 | 31 | 50 |
| Large | 2 | 11 | 9 | 12 | 6 | 10 | 73 | 64 | 39 |

It is observed in Table 2 that for the grips of Examples 1 to 6 according to the present invention, a large number of the persons have estimated the grips as good with respect to the feeling of touch and the non-slipping properties, in both fine weather and rainy weather, and have estimated the grips as being small or medium with respect to impact at mis-shot. In contrast, for the grips of Comparative Examples 1 to 3, a large number of the persons have estimated the grips as bad with respect to feeling of touch, and as being large with respect to the impact at mis-shot. In particular, an overwhelming majority of the persons have estimated the non-slipping property in rainy weather of the grip of Comparative Example 1 as being bad.

It would be understood that the rubber compositions according to the present invention which contain EPDM as a base rubber component and a specific amount of a specific polyisobutylene, provide grip materials having a good feeling of touch, good non-slipping properties in both fine and rainy weather, and give a small feeling of impact to mis-shot. In contrast, the grips of Comparative Examples 1 and 2 containing no polyisobutylene and the grip of Comparative Example 3 containing a large amount of polyisobutylene are poor in feeling of touch and give a large feeling of impact to mis-shot. Also, the grip of Comparative Example 1 which does not contain any softener is very poor in the non-slipping property in rainy weather.

In addition to the ingredients used in the Examples, other ingredients can be used in the Examples as set forth in the specification to obtain substantially the same results.

What we claim:

1. A rubber composition suitable for use in grips of articles, which consists essentially of (1) a rubber component containing an ethylene-propylene-diene rubber, and (2) 5 to 100 parts by weight of a polyisobutylene having a viscosity average molecular weight of 6,000 to 50,000 per 100 parts by weight of said rubber component.

2. The composition of claim 1, wherein said rubber component contains at least 55% by weight of said ethylene-propylene-diene rubber.

3. The composition of claim 1, wherein said rubber component consists of only said ethylene-propylene-diene rubber.

4. The composition of claim 1, wherein said rubber component consists of at least 55% by weight of said ethylene-propylene-diene rubber and at most 45% by weight of at least one other rubber selected from the group consisting of natural rubber, isoprene rubber, butadiene rubber, styrene-butadiene rubber, chloroprene rubber, butyl rubber, ethylene-propylene rubber and acrylonitrile rubber.

5. The composition of claim 1, wherein said polyisobutylene has a viscosity average molecular weight of 8,000 to 12,000.

6. The composition of claim 1, wherein the amount of said polyisobutylene is from 10 to 70 parts by weight per 100 parts by weight of said rubber component.

7. The composition of claim 1, which consists essentially of said components (1) and (2), includes 10 to 100 parts of a filler, 0.1 to 15 parts of a curing agent, 0.2 to 8 parts of a curing accelerator, and at most 70 parts of a softener or a plasticizer, said parts being parts by weight per 100 parts by weight of said rubber component (1).

8. A grip made of a rubber composition consisting essentially of (1) a rubber component containing an ethylene-propylene-diene rubber, and (2) 5 to 100 parts by weight of a polyisobutylene having a viscosity average molecular weight of 6,000 to 50,000 per 100 parts by weight of said rubber component.

9. The grip of claim 8, wherein said rubber component contains at least 55% by weight of said ethylene-propylene-diene rubber.

10. The grip of claim 8, wherein said rubber component consists of only said ethylene-propylene-diene rubber.

11. The grip of claim 8, wherein said rubber component consists of at least 55% by weight of said ethylene-propylene-diene rubber and at most 45% by weight of at least one other rubber selected from the group consisting of natural rubber, isoprene rubber, butadiene rubber, styrene-butadiene rubber, chloroprene rubber, butyl rubber, ethylene-propylene rubber and acrylonitrile rubber.

12. The grip of claim 8, wherein said polyisobutylene has a viscosity average molecular weight of 8,000 to 12,000.

13. The grip of claim 8, wherein the amount of said polyisobutylene is from 10 to 70 parts by weight per 100 parts by weight of said rubber component.

14. The grip of claim 8, which rubber composition thereof consists essentially of said components (1) and (2), includes 10 to 100 parts of a filler, 0.1 to 15 parts of a curing agent, 0.2 to 8 parts of a curing accelerator, and at most 70 parts of a softener or a plasticizer, said parts being parts by weight per 100 parts by weight of said rubber component.

15. The composition of claim 1, which consists essentially of said components (1) and (2), and includes sulfur as a curing agent.

16. The composition of claim 7, wherein said curing agent is sulfur.

17. The grip of claim 8, wherein said rubber composition is a sulfur-cured rubber composition.

18. The grip of claim 14, wherein said curing agent is sulfur.

\* \* \* \* \*